United States Patent
Chen

(10) Patent No.: US 10,871,697 B2
(45) Date of Patent: Dec. 22, 2020

(54) ELECTROPHORETIC DISPLAY DEVICE HAVING HEXAGONAL ELECTROPHORETIC DISPLAY UNITS AND DRIVING METHOD THEROF

(71) Applicant: E Ink Holdings Inc., Hsinchu (TW)

(72) Inventor: Jui-I Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 21 days.

(21) Appl. No.: 15/973,550

(22) Filed: May 8, 2018

(65) Prior Publication Data

US 2019/0278148 A1   Sep. 12, 2019

(30) Foreign Application Priority Data

Mar. 9, 2018   (TW) .............................. 107108145 A

(51) Int. Cl.
*G02F 1/167* (2019.01)
*G09G 3/34* (2006.01)
*G02F 1/16753* (2019.01)
*G02F 1/1675* (2019.01)

(52) U.S. Cl.
CPC ............ *G02F 1/167* (2013.01); *G02F 1/1675* (2019.01); *G02F 1/16753* (2019.01); *G09G 3/344* (2013.01)

(58) Field of Classification Search
CPC ..................................................... G02F 1/167
USPC ....................................................... 345/107
See application file for complete search history.

(56) References Cited

U.S. PATENT DOCUMENTS

| | | | |
|---|---|---|---|
| D372,158 S | 7/1996 | Bonaddio | |
| D418,613 S | 1/2000 | Lewis | |
| D446,318 S | 8/2001 | Lewis | |
| D697,641 S | 1/2014 | Ghoujaei Yousefi | |
| D737,523 S | 8/2015 | Strbik, III | |
| D764,683 S | 8/2016 | Metcalf | |
| 2009/0001469 A1 | 1/2009 | Yoshida et al. | |
| 2009/0268274 A1* | 10/2009 | Masuzawa | G02F 1/167 359/296 |
| 2011/0050657 A1* | 3/2011 | Yamada | H01L 27/3293 345/204 |
| 2011/0097549 A1* | 4/2011 | Verschueren | G02F 1/167 428/166 |
| 2011/0102881 A1* | 5/2011 | Verschueren | G02F 1/167 359/296 |
| 2016/0026061 A1 | 1/2016 | O'Keeffe | |

FOREIGN PATENT DOCUMENTS

| | | |
|---|---|---|
| CN | 102067029 B | 3/2013 |
| TW | 200522117 A | 7/2005 |

OTHER PUBLICATIONS

Corresponding Taiwan office action dated Jan. 7, 2019.

* cited by examiner

*Primary Examiner* — Long D Pham
(74) *Attorney, Agent, or Firm* — CKC & Partners Co., LLC

(57) ABSTRACT

An electrophoretic display device includes a plurality of hexagonal electrophoretic display units adjoined together, in which each of the hexagonal electrophoretic display units is constituted by three rhombic electrophoretic display panels or one hexagonal electrophoretic display panel, and the hexagonal electrophoretic display panel has three rhombic regions; and a control module configured to control gray scale of each of the rhombic electrophoretic display panels or each of the rhombic regions.

10 Claims, 4 Drawing Sheets

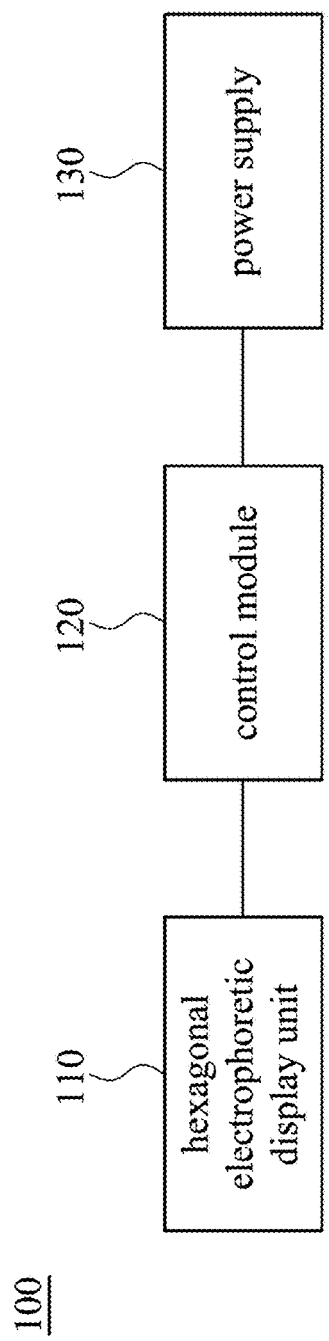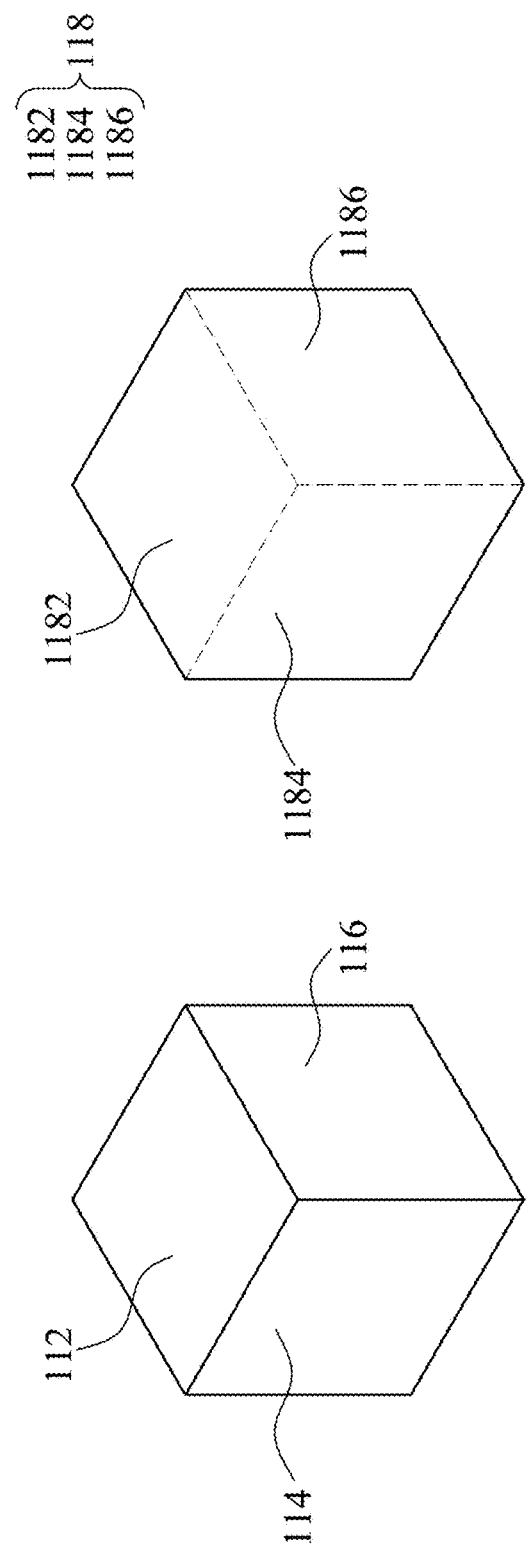

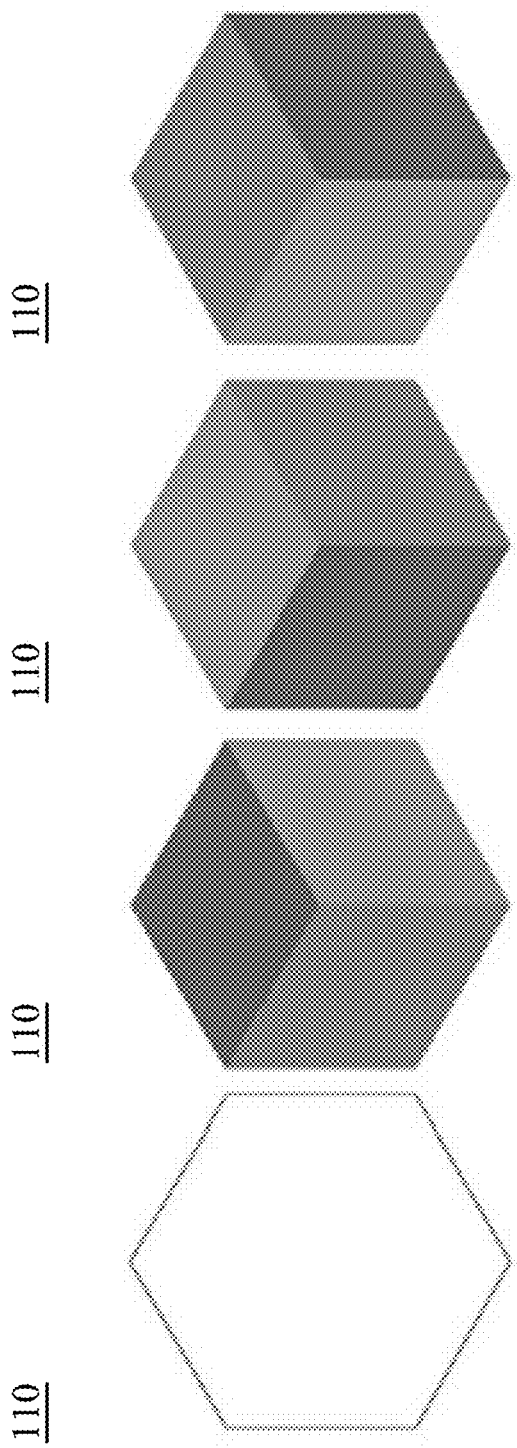

ELECTROPHORETIC DISPLAY DEVICE HAVING HEXAGONAL ELECTROPHORETIC DISPLAY UNITS AND DRIVING METHOD THEROF

CROSS-REFERENCE TO RELATED APPLICATION

This application claims priority to Taiwan Application Serial Number 107108145, filed Mar. 9, 2018, which is herein incorporated by reference.

BACKGROUND

Field of Invention

The present disclosure relates to an electrophoretic display device.

Description of Related Art

Wallpapers or tiles are used for current wall decoration. However, the wallpapers or tiles after collage are unable to change patterns and colors at any time, and lack of variability.

SUMMARY

A purpose of the present disclosure is to provide an electrophoretic display device. The electrophoretic display device includes a plurality of hexagonal electrophoretic display units adjoined together and a control module. Each hexagonal electrophoretic display unit is constituted by three rhombic electrophoretic display panels or one hexagonal electrophoretic display panel. The hexagonal electrophoretic display panel has three rhombic regions. The control module is configured to control gray scale of each of the rhombic electrophoretic display panels or each of the rhombic regions. Effects of displaying and changing patterns can be achieved by controlling the gray scale of each of the rhombic electrophoretic display panels or each of the rhombic regions. For example, it can exhibit a convex stereoscopic or concave stereoscopic display effect or can further change these stereoscopic display effects. The electrophoretic display device of the present disclosure can be widely applied to architectural fields (such as indoor and outdoor architectural wall surfaces) or viewing fields (such as decoration of installation art, shading, or paintings).

The present disclosure provides an electrophoretic display device includes a plurality of hexagonal electrophoretic display units adjoined together, in which each of the hexagonal electrophoretic display units is constituted by three rhombic electrophoretic display panels or one hexagonal electrophoretic display panel, and the hexagonal electrophoretic display panel has three rhombic regions; and a control module configured to control gray scale of each of the rhombic electrophoretic display panels or each of the rhombic regions.

According to some embodiments of the present disclosure, the electrophoretic display device further includes a power supply electrically connected to the hexagonal electrophoretic display units.

According to some embodiments of the present disclosure, the rhombic electrophoretic display panel or the hexagonal electrophoretic display panel has a frame covering an edge of the rhombic electrophoretic display panel or the hexagonal electrophoretic display panel.

According to some embodiments of the present disclosure, the rhombic electrophoretic display panel or the hexagonal electrophoretic display panel does not have a frame covering an edge of the rhombic electrophoretic display panel or the hexagonal electrophoretic display panel.

According to some embodiments of the present disclosure, an edge of the rhombic electrophoretic display panel or the hexagonal electrophoretic display panel is in contact with an edge of another rhombic electrophoretic display panel or another hexagonal electrophoretic display panel.

According to some embodiments of the present disclosure, the electrophoretic display device further includes a texture plate covering the hexagonal electrophoretic display units.

According to some embodiments of the present disclosure, the electrophoretic display device further includes a transparent substrate covering the hexagonal electrophoretic display units.

The present disclosure provides a method of driving the electrophoretic display device mentioned above, which includes: controlling times for applying driving voltage to the three rhombic electrophoretic display panels or the three rhombic regions to control gray scales of the three rhombic electrophoretic display panels or the three rhombic regions.

According to some embodiments of the present disclosure, a ratio of the times for applying the driving voltage to the three rhombic electrophoretic display panels or the three rhombic regions is 0:3-8:24-41 or 3-8:9-21:80-120.

According to some embodiments of the present disclosure, the times for applying the driving voltage to the three rhombic electrophoretic display panels or the three rhombic regions are different.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 1 is a functional block diagram of an electrophoretic display device according to some embodiments of the present disclosure;

FIG. 2 is a top view of a hexagonal electrophoretic display unit according to some embodiments of the present disclosure;

FIG. 3 is a top view of a hexagonal electrophoretic display unit according to some embodiments of the present disclosure;

FIGS. 4A-4D are schematic diagrams of different displays of a hexagonal electrophoretic display unit according to some embodiments of the present disclosure;

DETAILED DESCRIPTION

Figure 5:
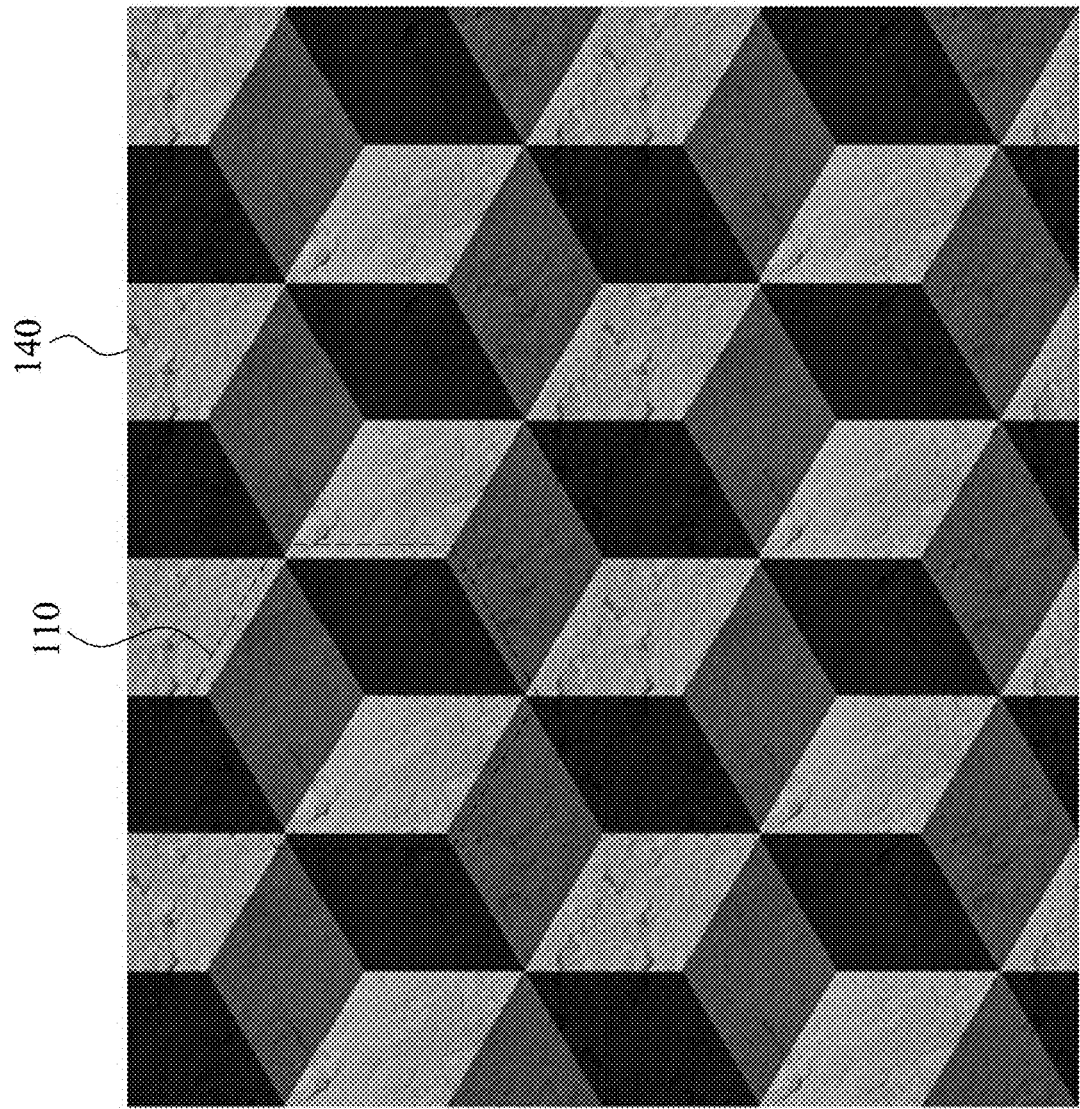
FIG. 5 is a top view of a plurality of hexagonal electrophoretic display units adjoined together according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A purpose of the present disclosure is to provide an electrophoretic display device. FIG. 1 is a functional block diagram of an electrophoretic display device according to some embodiments of the present disclosure. As shown in FIG. 1, the electrophoretic display device 100 includes a plurality of hexagonal electrophoretic display units 110 and a control module 120. In some embodiments, as shown in FIG. 1, the electrophoretic display device 100 further includes a power supply 130. The power supply 130 is electrically connected to the hexagonal electrophoretic display units 110 through the module 120. In some embodiments, the power supply 130 includes a battery.

FIG. 2 is a top view of a hexagonal electrophoretic display unit according to some embodiments of the present disclosure. As shown in FIG. 2, the hexagonal electrophoretic display unit 110 is constituted by three rhombic electrophoretic display panels 112, 114, 116.

FIG. 3 is a top view of a hexagonal electrophoretic display unit according to some embodiments of the present disclosure. As shown in FIG. 3, the hexagonal electrophoretic display unit 110 is constituted by one hexagonal electrophoretic display panel 118. The hexagonal electrophoretic display panel 118 has three rhombic regions 1182, 1184, 1186. The rhombic regions 1182, 1184, 1186 can be considered as sub-pixel structures/units.

Referring to FIGS. 1-3, the control module 120 is configured to control gray scale of each of the rhombic electrophoretic display panels 112, 114, 116 or each of the rhombic regions 1182, 1184, 1186. It can exhibit a convex stereoscopic or concave stereoscopic display effect or can further change these stereoscopic display effects by controlling gray scale of each of the rhombic electrophoretic display panels 112, 114, 116 or each of the rhombic regions 1182, 1184, 1186.

In some embodiments, as shown in FIGS. 2 and 3, the rhombic electrophoretic display panels 112, 114, 116 or the hexagonal electrophoretic display panel 118 does not have a frame covering an edge thereof. In some embodiments, the rhombic electrophoretic display panels 112, 114, 116 or the hexagonal electrophoretic display panel 118 has a frame covering an edge thereof. In some embodiments, the frame has a width in a range of 0.1 cm to 0.5 cm.

FIGS. 4A-4D are schematic diagrams of different displays of a hexagonal electrophoretic display unit according to some embodiments of the present disclosure. In some embodiments, as shown in FIGS. 2, 3 and 4A, each of the rhombic electrophoretic display panels 112, 114, 116 or each of the rhombic regions 1182, 1184, 1186 displays white color. In other embodiments, each of the rhombic electrophoretic display panels 112, 114, 116 or each of the rhombic regions 1182, 1184, 1186 displays black color. In some embodiments, as shown in FIGS. 2, 3, 4B, 4C and 4D, the three rhombic electrophoretic display panels 112, 114, 116 or the three rhombic regions 1182, 1184, 1186 respectively display different gray scales to exhibit a stereoscopic display effect.

FIG. 5 is a top view of a plurality of hexagonal electrophoretic display units adjoined together according to some embodiments of the present disclosure. As shown FIG. 5, the hexagonal electrophoretic display units 110 are adjoined together. As shown in FIGS. 1 and 5, it can exhibit a convex stereoscopic display effect by controlling gray scales of the rhombic electrophoretic display panels or the rhombic regions of each of the hexagonal electrophoretic display units 110. In other embodiments, it can exhibit a concave stereoscopic display effect. In other embodiments, it can exhibit a dynamic stereoscopic display effect by controlling gray scale of each of the rhombic electrophoretic display panels or each of the rhombic regions through the control module 120. In some embodiments, an edge of the rhombic electrophoretic display panel or the hexagonal electrophoretic display panel is in contact with an edge of another rhombic electrophoretic display panel or another hexagonal electrophoretic display panel. In other embodiments, the electrophoretic display device may also be constituted by a plurality of hexagonal electrophoretic display units 110 adjoined together that can present different colors.

In some embodiments, as shown in FIG. 5, the electrophoretic display device further includes a texture plate 140. The texture plate 140 can cover entire or a specific region of the hexagonal electrophoretic display units 110 to exhibit a texture of a specific material, such as stone-like texture or wood-like texture.

Figure 6:
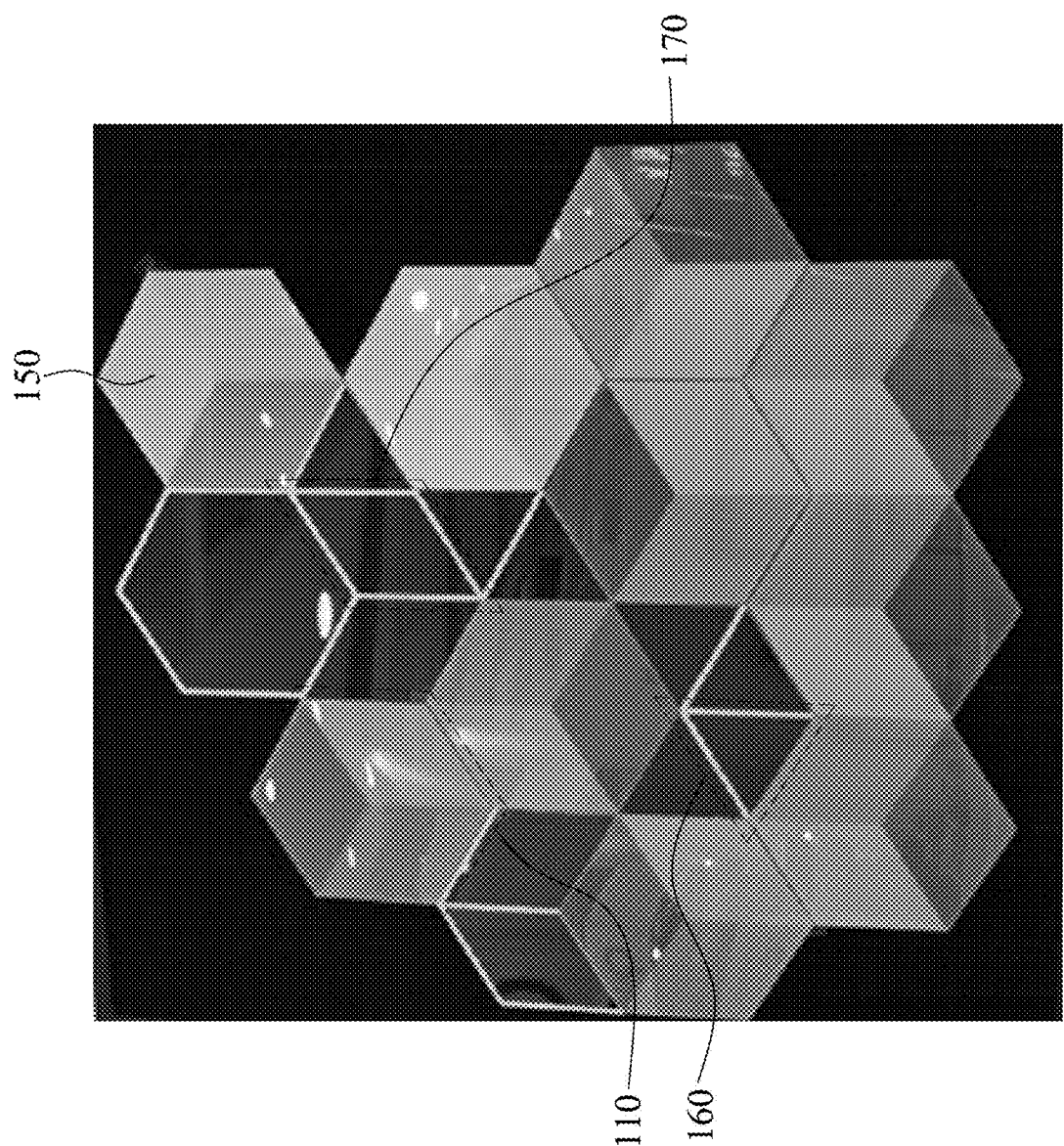
FIG. 6 is a top view of a plurality of hexagonal electrophoretic display units adjoined together according to some embodiments of the present disclosure.

FIG. 6 is a top view of a plurality of hexagonal electrophoretic display units adjoined together according to some embodiments of the present disclosure. As shown in FIG. 6, the electrophoretic display device includes a plurality of hexagonal electrophoretic display units 110 adjoined together. As shown in FIGS. 1 and 6, it can exhibit a convex stereoscopic or concave stereoscopic display effect by controlling gray scales of the rhombic electrophoretic display panels or the rhombic regions of each of the hexagonal electrophoretic display units 110. In some embodiments, the electrophoretic display device further includes a triangular electrophoretic display unit 160 or a rhombic electrophoretic display unit 170, which can be adjoined with the hexagonal electrophoretic display unit 110 to present a special visual effect.

In some embodiments, the electrophoretic display device further includes a transparent substrate 150. The transparent substrate 150 can cover entire or a specific region of the hexagonal electrophoretic display units 110 to protect the hexagonal electrophoretic display units 110. In some embodiments, the transparent substrate 150 may be a glass substrate. In some embodiments, the transparent substrate 150 may be a transparent plastic substrate, such as an acrylic sheet.

The electrophoretic display device mentioned above can be widely applied to architectural fields (such as indoor and outdoor architectural wall surfaces) or viewing fields (such as decoration of installation art, shading, or paintings).

Another purpose of the present disclosure is to provide a method of driving the electrophoretic display device mentioned above. Referring to FIGS. 2 and 3, the method includes controlling times for applying driving voltage to the three rhombic electrophoretic display panels 112, 114, 116 or the three rhombic regions 1182, 1184, 1186 to control gray scales of the three rhombic electrophoretic display panels 112, 114, 116 or the three rhombic regions 1182, 1184, 1186. The longer the time when the driving voltage is applied, the darker the display color of the rhombic electrophoretic display panel or the rhombic region. In contrast, the shorter the time when the driving voltage is applied, the lighter the display color of the rhombic electrophoretic display panel or the rhombic region.

In some embodiments, a ratio of the times for applying the driving voltage to the three rhombic electrophoretic display panels or the three rhombic regions is 0:3-8:24-41 or 3-8:9-21:80-120. In some embodiments, a ratio of the times for applying the driving voltage to the three rhombic electrophoretic display panels or the three rhombic regions is 0:4-6:25-40 or 5-7:10-20:90-110. In some embodiments, the time for applying the driving voltage is 0 ms, 30-80 ms, 90-210 ms, 240-410 ms or greater than or equal to 900 ms. In some embodiments, the times for applying the driving voltage to the three rhombic electrophoretic display panels or the three rhombic regions are same or different. In some embodiments, the time for applying the driving voltage to the three rhombic electrophoretic display panels or the three rhombic regions is 0 ms, 50-70 ms, 100-200 ms, or greater than or equal to 1000 ms. In some embodiments, the times for applying the driving voltage to the three rhombic electrophoretic display panels or the three rhombic regions respectively are 0 ms, 40-60 ms and 250-400 ms.

In other embodiments, the gray scales may also be controlled by controlling driving voltages to each of the rhombic electrophoretic display panels or each of the rhombic regions. For example, the higher the driving voltage, the darker the display color of the rhombic electrophoretic display panel or the rhombic region. In contrast, the lower the driving voltage, the lighter the display color of the rhombic electrophoretic display panel or the rhombic region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrophoretic display device, comprising:
a plurality of hexagonal electrophoretic display units adjoined together, wherein each of the hexagonal electrophoretic display units is constituted by three rhombic electrophoretic display panels or one hexagonal electrophoretic display panel, and the hexagonal electrophoretic display panel has three rhombic regions;
a controller configured to control gray scale of each of the rhombic electrophoretic display panels or each of the rhombic regions; and
a triangular electrophoretic display unit adjoined with one of the hexagonal electrophoretic display units.

2. The electrophoretic display device of claim 1, further comprising:
a power supply electrically connected to the hexagonal electrophoretic display units.

3. The electrophoretic display device of claim 1, wherein the rhombic electrophoretic display panel or the hexagonal electrophoretic display panel has a frame covering an edge of the rhombic electrophoretic display panel or the hexagonal electrophoretic display panel.

4. The electrophoretic display device of claim 1, wherein the rhombic electrophoretic display panel or the hexagonal electrophoretic display panel does not have a frame covering an edge of the rhombic electrophoretic display panel or the hexagonal electrophoretic display panel.

5. The electrophoretic display device of claim 1, wherein an edge of the rhombic electrophoretic display panel or the hexagonal electrophoretic display panel is in contact with an edge of another rhombic electrophoretic display panel or another hexagonal electrophoretic display panel.

6. The electrophoretic display device of claim 1, further comprising:
a texture plate covering the hexagonal electrophoretic display units.

7. The electrophoretic display device of claim 1, further comprising:
a transparent substrate covering the hexagonal electrophoretic display units.

8. A method of driving the electrophoretic display device of claim 1, the method comprising:
controlling times for applying driving voltage to the three rhombic electrophoretic display panels or the three rhombic regions to control gray scales of the three rhombic electrophoretic display panels or the three rhombic regions.

9. The method of claim 8, wherein a ratio of the times for applying the driving voltage to the three rhombic electrophoretic display panels or the three rhombic regions is 0:3-8:24-41 or 3-8:9-21:80-120.

10. The method of claim 8, wherein the times for applying the driving voltage to the three rhombic electrophoretic display panels or the three rhombic regions are different.

* * * * *